(12) United States Patent
Dragojevic et al.

(10) Patent No.: US 11,876,455 B2
(45) Date of Patent: Jan. 16, 2024

(54) MULTI-MODE TWO-PHASE BUCK CONVERTER

(71) Applicant: Dialog Semiconductor (UK) Limited, London (GB)

(72) Inventors: Milan Dragojevic, West Roxbury, MA (US); James T. Doyle, Phoenix, AZ (US); Ambreesh Bhattad, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 189 days.

(21) Appl. No.: 17/575,842

(22) Filed: Jan. 14, 2022

(65) Prior Publication Data

US 2022/0231607 A1 Jul. 21, 2022

Related U.S. Application Data

(60) Provisional application No. 63/137,960, filed on Jan. 15, 2021.

(51) Int. Cl.
*H02M 3/335* (2006.01)
*H02M 3/158* (2006.01)
*H02M 1/00* (2006.01)

(52) U.S. Cl.
CPC ....... *H02M 3/1588* (2013.01); *H02M 1/0009* (2021.05)

(58) Field of Classification Search
CPC .............. H02M 3/1588; H02M 1/0009; H02M 1/0058; H02M 3/01; H02M 3/1584
See application file for complete search history.

(56) References Cited

U.S. PATENT DOCUMENTS

| 6,486,642 B1 * | 11/2002 | Qian | ............. | H02M 3/158 323/255 |
| 7,215,101 B2 * | 5/2007 | Chang | ............. | H02M 3/158 323/224 |

(Continued)

OTHER PUBLICATIONS

Texas Instruments Data Sheet, LM2611 1.4-MHz Cuk Converter, SNOS965J—Jun. 2001—Revised Dec. 2015, 29 pages.

(Continued)

*Primary Examiner* — Kyle J Moody
(74) *Attorney, Agent, or Firm* — Saile Ackerman LLC; Stephen B. Ackerman

(57) ABSTRACT

The present document relates to power converters. A power converter may be configured to convert an input voltage at an input of the power converter into an output voltage at an output of the power converter. The power converter may comprise a first switching circuit with a first inductor, a first high-side switching element, and a first low-side switching element. The power converter may comprise a second switching circuit with a second inductor, a second high-side switching element, and a second low-side switching element. The power converter may comprise a capacitive element having a first terminal coupled to the first high-side switching element and to the second high-side switching element and having a second terminal coupled to the first low-side switching element at a first node. The power converter may comprise a third switching element coupled between the first node and the output of the power converter.

24 Claims, 9 Drawing Sheets

(56) References Cited

U.S. PATENT DOCUMENTS

| | | | |
|---|---|---|---|
| 7,915,874 B1 | 3/2011 | Cuk | |
| 8,207,717 B2* | 6/2012 | Uruno | H02M 3/1582 323/225 |
| 10,574,144 B1* | 2/2020 | Ramabhadran | H02M 1/14 |
| 11,201,544 B2* | 12/2021 | Zambetti | H02M 3/285 |
| 2002/0118000 A1* | 8/2002 | Xu | H02M 3/158 323/259 |
| 2006/0103359 A1* | 5/2006 | Watanabe | H02M 3/1584 323/225 |
| 2015/0311792 A1* | 10/2015 | Amaro | H02M 3/1584 323/271 |
| 2017/0126120 A1* | 5/2017 | Chakraborty | H02M 3/158 |

OTHER PUBLICATIONS

Electronics Weekly, 'Cuk-buck 2' dc-dc converter—more fine art from Slobodan's pen, by Steve Bush, pp. 1-3, Jan. 13, 2017, found: https://www.electronicsweekly.com/blogs/engineer-in-wonderland/cuk-b . . . .

* cited by examiner

MULTI-MODE TWO-PHASE BUCK CONVERTER

This application claims the benefit of U.S. Provisional patent application Ser. No. 63/137,960, filed on Jan. 15, 2021, which is herein incorporated by reference in its entirety, and assigned to a common assignee.

TECHNICAL FIELD

The present document relates to power converters. In particular, the present document relates to a novel topology of a two-phase buck power converter, and a corresponding method of operating the two-phase buck power converter using a plurality of modes.

BACKGROUND

A very high duty-cycle buck converter can be implemented using one of the following implementation alternatives: A multi-level converter, a step-down transformer, multi-stage converter or a cascade of converters, or a low dropout (LDO) regulator. If the load of the converter is low (e.g. for load currents smaller than 400 mA), the usage of a switching regulator becomes problematic. In particular, timing control for the high-side switches may become very critical, and may force the inductor into saturation. Therefore, using a standard hard switching converter would require very tight control of the timing of the high-side switch, which would be very difficult to control over various operating conditions. The timing control can only be achieved with extra complexity and/or external components. Therefore, a power converter is required that achieves a very large conversion ratio with a minimum number of external components and a high efficiency e.g. compared to an LDO.

SUMMARY

The present document addresses the above mentioned technical problems. In particular, the present document addresses the technical problem of providing a novel buck power converter and a corresponding method for operating the buck power converter.

According to an aspect, a power converter is presented. The power converter may be configured to convert an input voltage at an input of the power converter into an output voltage at an output of the power converter. The power converter may comprise a first switching circuit with a first inductor, a first high-side switching element, and a first low-side switching element. The power converter may comprise a second switching circuit with a second inductor, a second high-side switching element, and a second low-side switching element. The power converter may comprise a capacitive element having a first terminal coupled to the first high-side switching element and to the second high-side switching element, and having a second terminal coupled to the first low-side switching element at a first node. The power converter may comprise a third switching element coupled between the first node and the output of the power converter.

With the third switching element coupled between the first node and the output of the power converter, it becomes possible to prevent a negative current through the first inductor and to increase the efficiency of the power converter in discontinuous conduction mode (DCM).

The power converter may be e.g. a buck power converter, and the buck power converter may be configured to down-convert the input voltage to the output voltage, i.e. the input voltage may be greater than or equal to the output voltage. At the same time, an input current may be smaller than or equal to an output current of the power converter.

Each of the switching elements may be implemented with any suitable device, such as, for example, a metal-oxide-semiconductor field effect transistor (MOSFET), an insulated-gate bipolar transistor (IGBT), a MOS-gated thyristor, or any other suitable power device. Each switching element may have a control terminal to which a respective driving voltage or control signal may be applied to turn the switching element on (i.e. to close the switching element) or to turn the switching element off (i.e. to open the switching element). The capacitive element may be e.g. a capacitor or another device capable of storing electrical energy in an electric field.

Further, the power converter may comprises a control circuit for generating control signals for controlling the switching elements according to different modes of operation as will be discussed in the following description. The power converter may further comprise an output capacitor coupled between the output of the power converter and a reference potential (such as e.g. ground).

The third switching element and the first inductor may be coupled in series between the first node and the output of the power converter. For instance, the third switching element may be coupled between the first node and the first inductor, and the first inductor may be coupled between the third switching element and the output of the power converter. Alternatively, the first inductor may be coupled between the first node and the third switching element, and the third switching element may be coupled between the first inductor and the output of the power converter. More specifically, a first terminal of the third switching element may be coupled to the first node and a second terminal of the third switching element may be coupled to the first inductor at a second node.

The power converter may further comprise a directional conducting element coupled between the second node and the input of the power converter. As a first example, the directional conducting element may be directly coupled between the second node and the input of the power converter. As a second example, the directional conducting element may be connected between the second node and the first terminal of the capacitive element, i.e. the directional conducting element may be coupled between the second node and the input of the power converter via (a body diode of) the first high-side switching element. As a third example, the directional conducting element may be coupled to a terminal (e.g. a source terminal) of the second high-side switching element i.e. the directional conducting element may be coupled between the second node and the input of the power converter via the second high-side switching element and via the first high-side switching element. In particular, directional conducting element may be coupled between the second node and the input of the power converter via a body-diode of the second high-side switching element and via a body-diode of the first high-side switching element. In all examples, with the directional conducting element coupled between the second node and the input of the power converter, it becomes possible to protect the third switching element from large voltage spikes e.g. when the third switching element is turned off.

The directional conducting element may be e.g. a diode or a Schottky diode. In this document, the directional conducting element is considered as an electronic component with at least two terminals that conducts primarily in one direction. That is, the directional conducting element may have low resistance to the flow of current in a first direction, and high resistance in a second, opposite direction. For instance, the directional conduction element may have a low resistance to the flow of current from the second node to the input of the power converter, and a high resistance in the opposite direction. An ideal diode would exhibit zero resistance in the first direction and infinite resistance in the second direction. As an example, a (diode-connected) transistor operated as an active diode may serve as diode in the context of this document.

The first inductor and the second inductor may be positively coupled or negatively coupled. Moreover, the power converter may further comprise a zero crossing detector configured to detect a time when a current through the first inductor reaches zero. The power converter may be configured to turn off the third switching element when said current through the first inductor reaches zero.

The power converter may be configured to establish, in a first forward mode, a first forward current path from the input of the power converter via the first high-side switching element, via the capacitive element, via the third switching element, and via the first inductor to the output of the power converter. In particular, the power converter may be configured to turn on both the first high-side switching element and the third switching element in the first forward mode.

The power converter may be configured to establish, in a first free-wheel mode, a first free-wheel current path from the first low-side switching element, via the third switching element, and via the first inductor to the output of the power converter. In particular, the power converter may be configured to turn on both the first low-side switching element and the third switching element in the first free-wheel mode.

The power converter may be configured to establish, in a second forward mode, a second forward current path from the first low-side switching element, via the capacitive element, via the second high-side switching element, and via the second inductor to the output of the power converter. In particular, the power converter may be configured to turn on both the first low-side switching element and the second high-side switching element in the second forward mode.

The power converter may be configured to establish, in a second free-wheel mode, a second free-wheel current path from the second low-side switching element, and via the second inductor to the output of the power converter. In particular, the power converter may be configured to turn on the second low-side switching element in the second free-wheel mode.

The power converter may be configured to switch between the first forward mode, the first free-wheel mode, the second forward mode, and the second free-wheel mode e.g. based on feedback signals indicative of the voltage or the current at the output of the power converter. At this, the power converter may comprise one or more comparators and/or error amplifiers for comparing said feedback signals against respective reference values.

The first high-side switching element may be coupled between the input of the power converter and the first terminal of the capacitive element. The first low-side switching element may be coupled between the first node and a reference potential. The second high-side switching element may be coupled between the first terminal of the capacitive element and a first terminal of the second inductor. The second low-side switching element may be coupled between the first terminal of the second inductor and the reference potential. A second terminal of the second inductor may be coupled to the output of the power converter.

Throughout this document, the term "reference potential" is meant in its broadest possible sense. In particular, the reference potential is not limited to ground i.e. a reference potential with a direct physical connection to earth. Rather, the term "reference potential" may refer to any reference point to which and from which electrical currents may flow or from which voltages may be measured. Moreover, it should be mentioned that the reference potentials mentioned in this document may not necessarily refer to the same physical contact. Instead, the reference potentials mentioned in this document may relate to different physical contacts although reference is made to "the" reference potential for ease of presentation.

According to another aspect, a method of operating a power converter is presented. The steps of the method may correspond to the functional features of the power converter presented in the foregoing description. In particular, the power converter may convert an input voltage at an input of the power converter into an output voltage at an output of the power converter. The power converter may comprise a first switching circuit with a first inductor, a first high-side switching element, and a first low-side switching element. The power converter may comprise a second switching circuit with a second inductor, a second high-side switching element, and a second low-side switching element. The method may comprise coupling a first terminal of a capacitive element to the first high-side switching element and to the second high-side switching element. The method may comprise coupling a second terminal of the capacitive element to the first low-side switching element at a first node. The method may comprise coupling a third switching element between the first node and the output of the power converter.

The method may comprise coupling the third switching element and the first inductor in series between the first node and the output of the power converter. To be more specific, the method may comprise coupling a first terminal of the third switching element to the first node. The method may comprise coupling a second terminal of the third switching element to the first inductor at a second node. The method may comprise coupling a directional conducting element between the second node and the input of the power converter. The first inductor and the second inductor may be positively coupled or negatively coupled.

The power converter may comprise a zero crossing detector for detecting a time when a current through the first inductor reaches zero. The method may comprise turning off the third switching element when said current through the first inductor reaches zero.

The method may comprise establishing, in a first forward mode, a first forward current path from the input of the power converter via the first high-side switching element, via the capacitive element, via the third switching element, and via the first inductor to the output of the power converter. The method may comprise establishing, in a first free-wheel mode, a first free-wheel current path from the first low-side switching element, via the third switching element, and via the first inductor to the output of the power converter. The method may comprise establishing, in a second forward mode, a second forward current path from the first low-side switching element, via the capacitive element, via the second high-side switching element, and via the second inductor to the output of the power converter. The method may comprise establishing, in a second free-wheel mode, a second free-wheel current path from the second low-side switching element, and via the second inductor to the output of the power converter. The method may comprise switching between the first forward mode, the first free-wheel mode, the second forward mode, and the second free-wheel mode based on a feedback signal indicative of the voltage or a current at the output of the power converter.

The method may comprise coupling the first high-side switching element between the input of the power converter and the first terminal of the capacitive element. The method may comprise coupling the first low-side switching element between the first node and a reference potential. The method may comprise coupling the second high-side switching element between the first terminal of the capacitive element and a first terminal of the second inductor. The method may comprise coupling the second low-side switching element between the first terminal of the second inductor and the reference potential.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which.

DESCRIPTION

Figure 1:
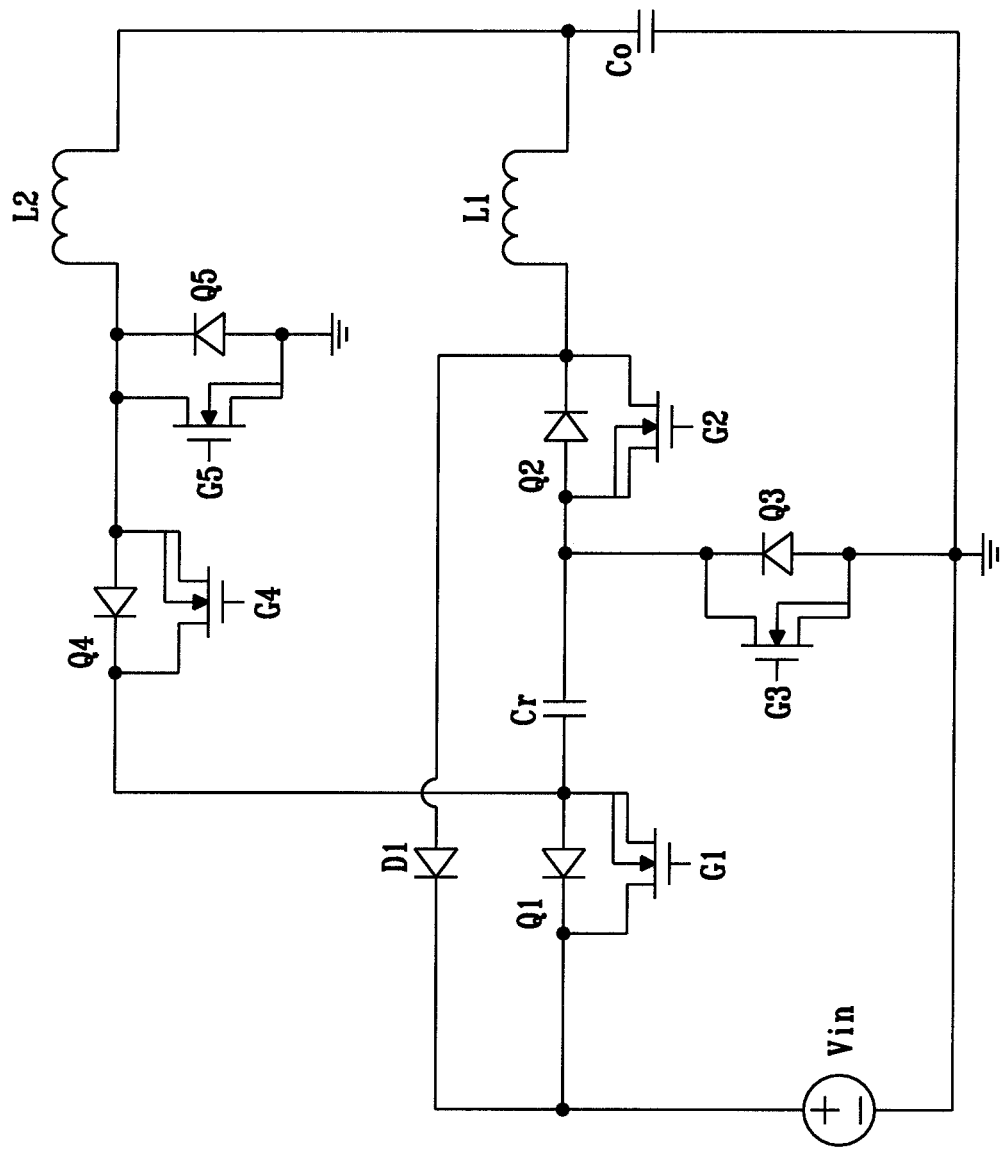
FIG. 1 shows an exemplary multi-mode two-phase buck converter.

FIG. 1 shows an exemplary multi-mode two-phase buck converter. The power converter has a first switching circuit (also denoted as first phase) with a first inductor L1, a first high-side transistor Q1, and a first low-side transistor Q3.

The first switching circuit may also be denoted as first phase of the (multi-phase) buck converter. The power converter also has a second switching circuit with a second inductor L2, a second high-side transistor Q4, and a second low-side transistor Q5. The second switching circuit may also be denoted as second phase of the (multi-phase) buck converter. In addition, the power converter comprises a resonant capacitor Cr (capacitive element), a transistor Q3 (third switching element), and a diode D1 (directional conducting element). Every transistor has a corresponding gate G1-G5 to which a control signal may be applied. Moreover, FIG. 1 illustrates a body diode for each transistor, wherein body diodes a shown between the source and the drain of each transistor.

Figure 2:
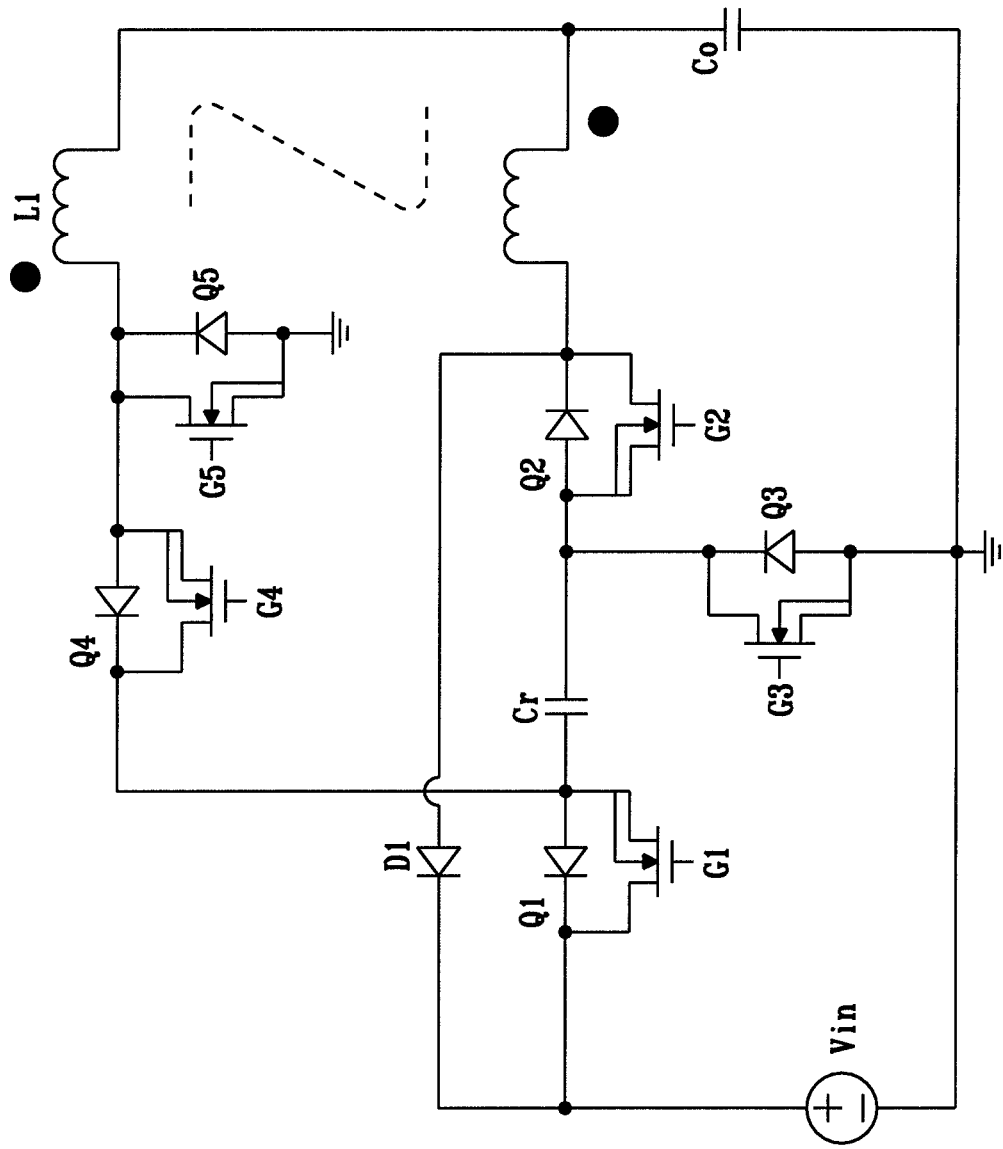
FIG. 2 shows an exemplary negatively coupled multi-mode two-phase buck converter.
Figure 3:
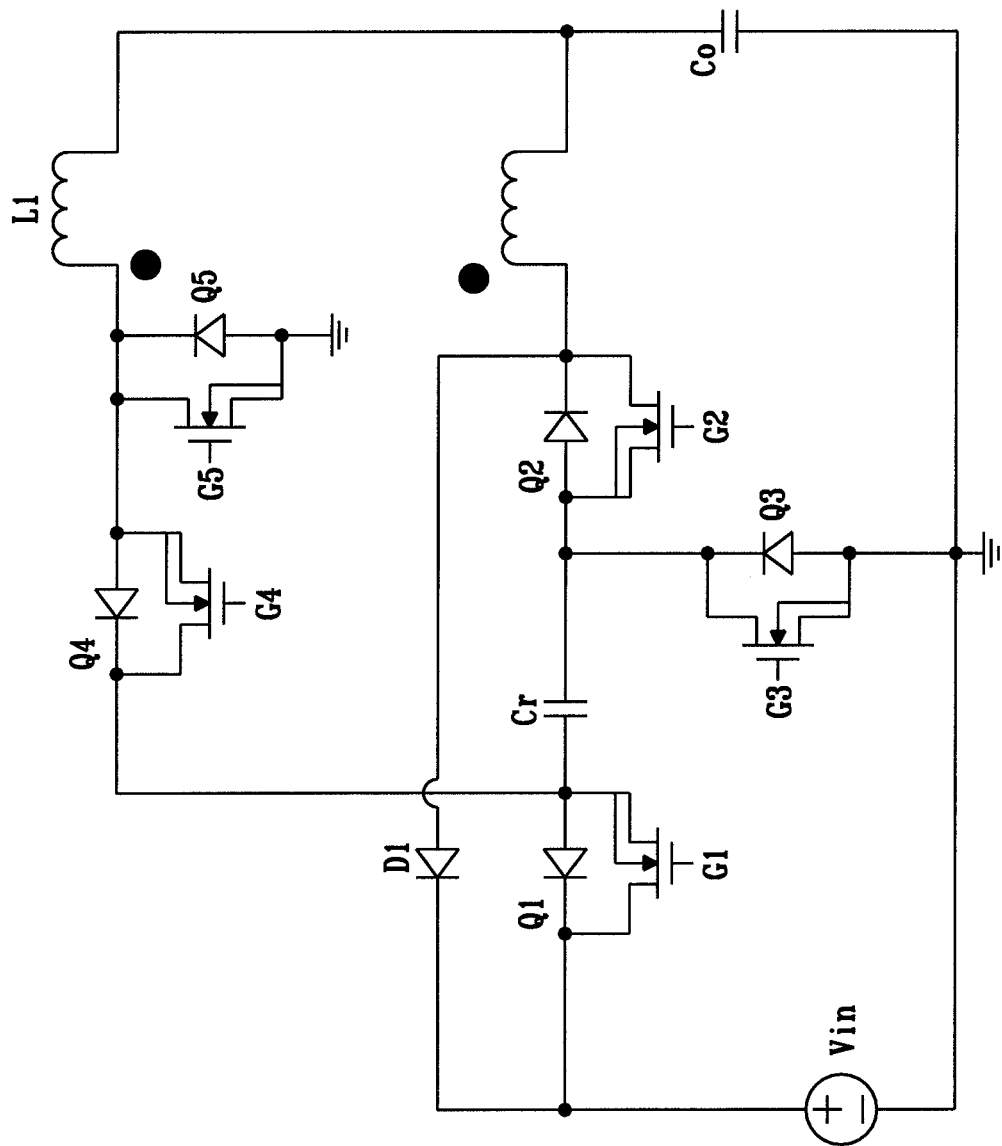
FIG. 3 shows an exemplary positively coupled multi-mode two-phase buck converter.

The buck converter shown in FIG. 1 solves several problems associated with prior art power converters. The buck converter can operate in pulse width modulation (PWM) and in resonant mode. When the buck converter operates in resonant mode, there are two resonant tanks: A first resonant tank is formed by series capacitor Cr and inductor L1, and a second resonant tank is formed by Cr and inductor L2. Inductors L1 and L2 can be coupled in one magnetic structure. It can work as positive coupled inductor or as negative coupled inductor. FIG. 2 shows an exemplary negatively coupled multi-mode two-phase buck converter. FIG. 3 shows an exemplary positively coupled multi-mode two-phase buck converter.

The diode D1 is used as protection diode in case the current in switch Q2 is switched off in direction drain to source. This can happen if Q2 is designed to work in diode emulation mode and a zero current cross detector has a delay and the current changes direction. It can also be activated during fast transients like e.g. a changing output voltage from high to low.

Figure 4:
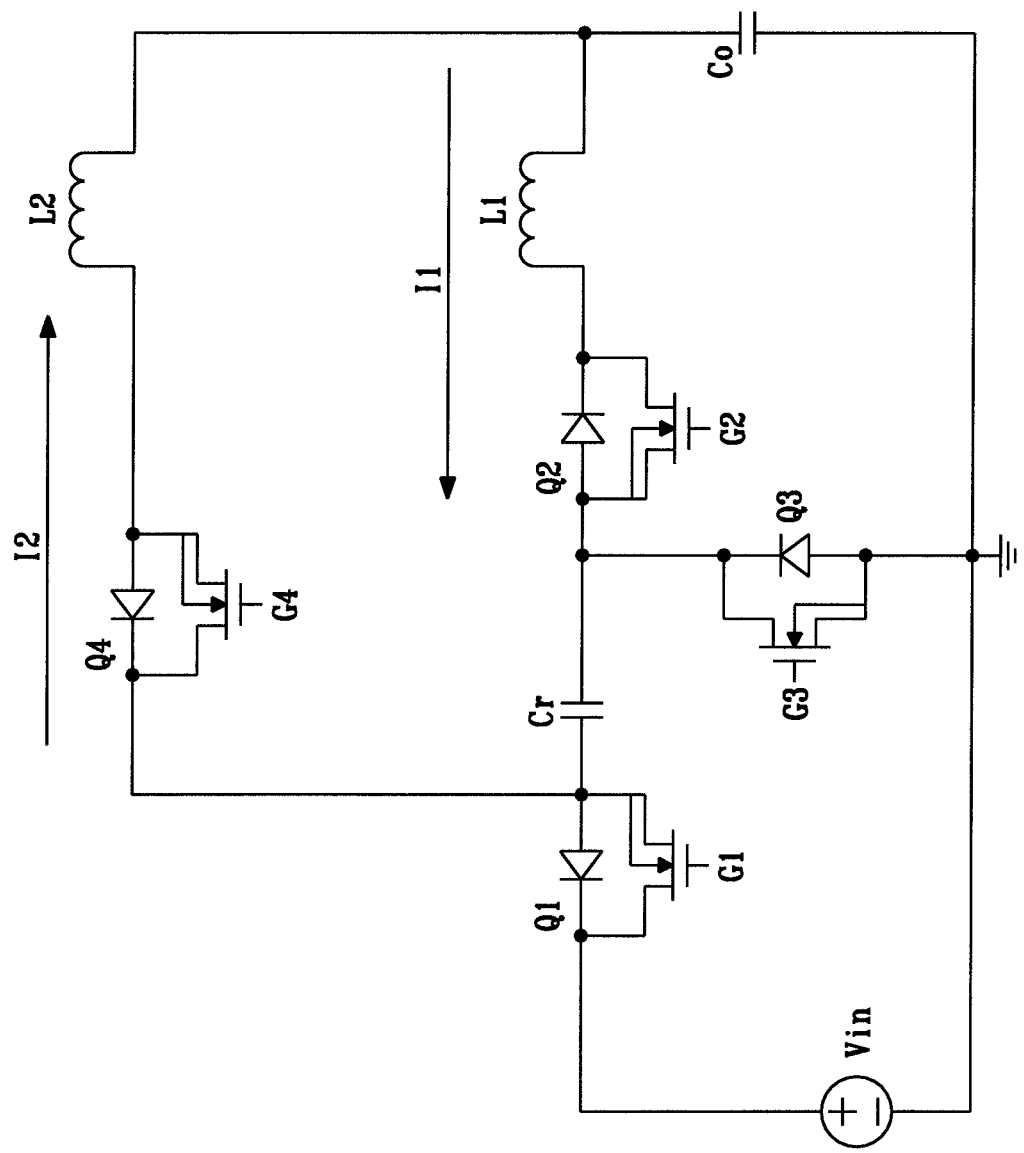
FIG. 4 shows an alternative implementation of a buck converter.

In the following description, two alternative buck converters and their problems are described (i.e. the buck converters in FIG. 4 and FIG. 5) in order to explain the technical advantages of the power converter in FIG. 1. Firstly, FIG. 4 shows an alternative implementation of a buck converter which has two problems that can affect performance. A first problem may occur if switch Q4 is turned off if the current I2 is in the direction shown in FIG. 4. Turning off switch Q4 if the current I2 is in this direction creates a voltage on the source of Q4 and damages the switch Q4. This converter may be designed to conduct current only in direction source to drain, but it is possible to create a condition that current flows in that direction shown in FIG. 4. A second problem may occur if switch Q2 is turned off if the current I1 is in the direction shown in FIG. 4. Turning off switch Q2 if the current I1 is in direction shown in FIG. 4 also creates large voltage spikes on switch Q2. The converter typically does not conduct current in this direction, but this scenario may happen if a zero current detector has large propagation delay. This second problem is solved by the circuit in FIG. 1 by introducing diode D1.

Figure 5:
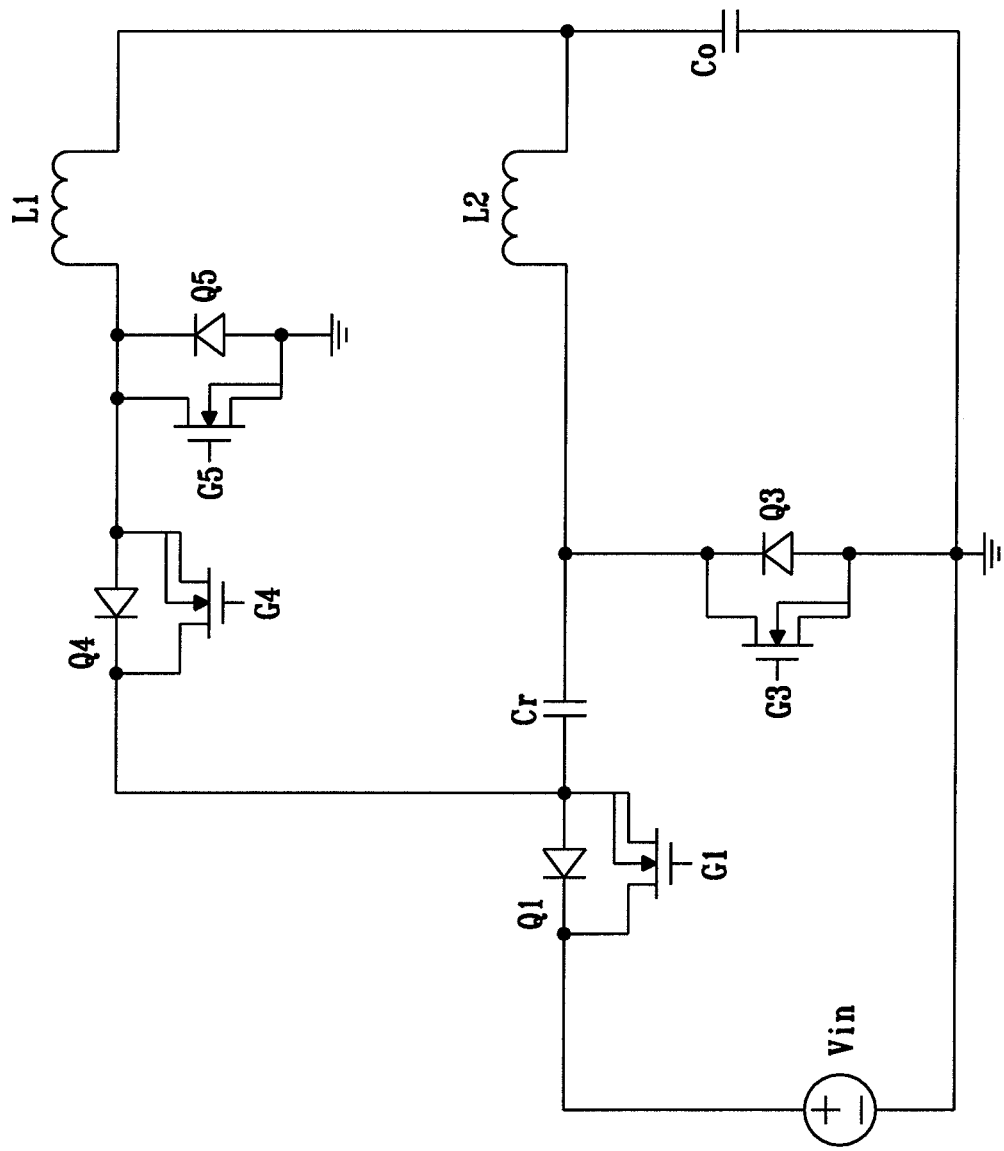
FIG. 5 shows another alternative implementation of a buck converter.
Figure 6:
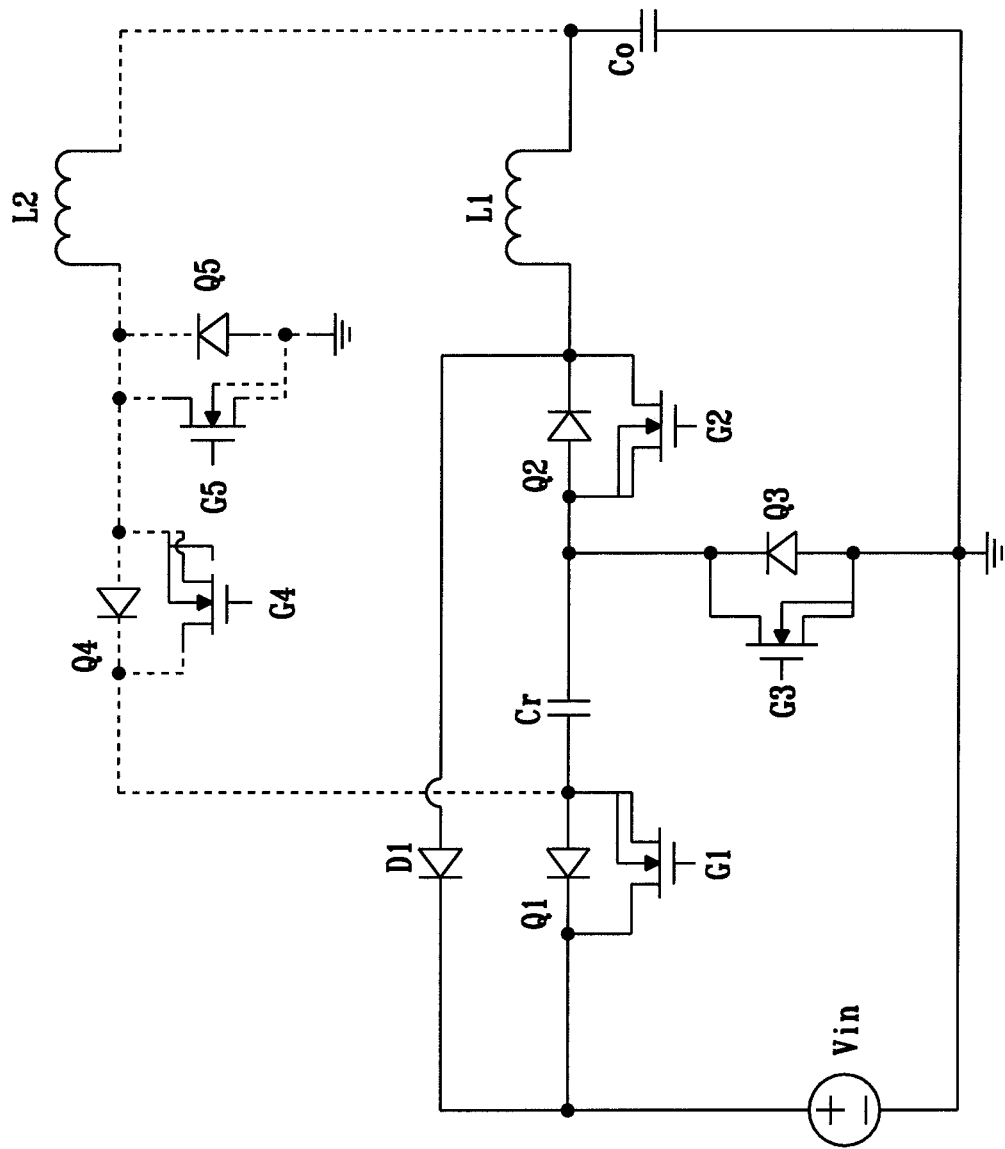
FIG. 6 shows the buck converter of FIG. 1 in a first forward mode of the first phase.

Secondly, FIG. 5 shows another alternative implementation of a buck converter. The buck converter in FIG. 5 is highly inefficient when operating in discontinuous conduction mode (DCM). The switch Q3 is acting as free-wheel switch for inductor L1, but also as forward switch for inductor L2. When the buck converter in FIG. 6 is set to work in DCM mode, turning on the switches Q3 and Q4 will initiate a negative current in inductor L1. That will decrease efficiency. This problem is solved by introducing switch Q2 in the proposed buck converter shown in FIG. 1.

As already mentioned, the presented buck converter may be seen as two out-of-phase buck converters coupled via the resonant capacitor Cr. FIG. 6 shows the buck converter of FIG. 1 in a first forward mode of the first phase. In the first forward mode of the first phase, switches Q4 and Q5 may be turned off and a current may flow from the input Vin via switch Q1, via capacitor Cr, via switch Q2, and via inductor L1 to the output. As can be seen in FIG. 6, an output capacitor $C_O$ may be coupled between the output and ground. Transistor Q3 may be turned off or may be operated in diode emulation mode. The first phase operates like a traditional buck stage with addition of the resonant capacitor Cr. The forward current path is shown in FIG. 6. During this period (forward current period), the power is delivered to the output, and some energy is stored in inductor L1 and in resonant capacitor Cr.

Figure 7:
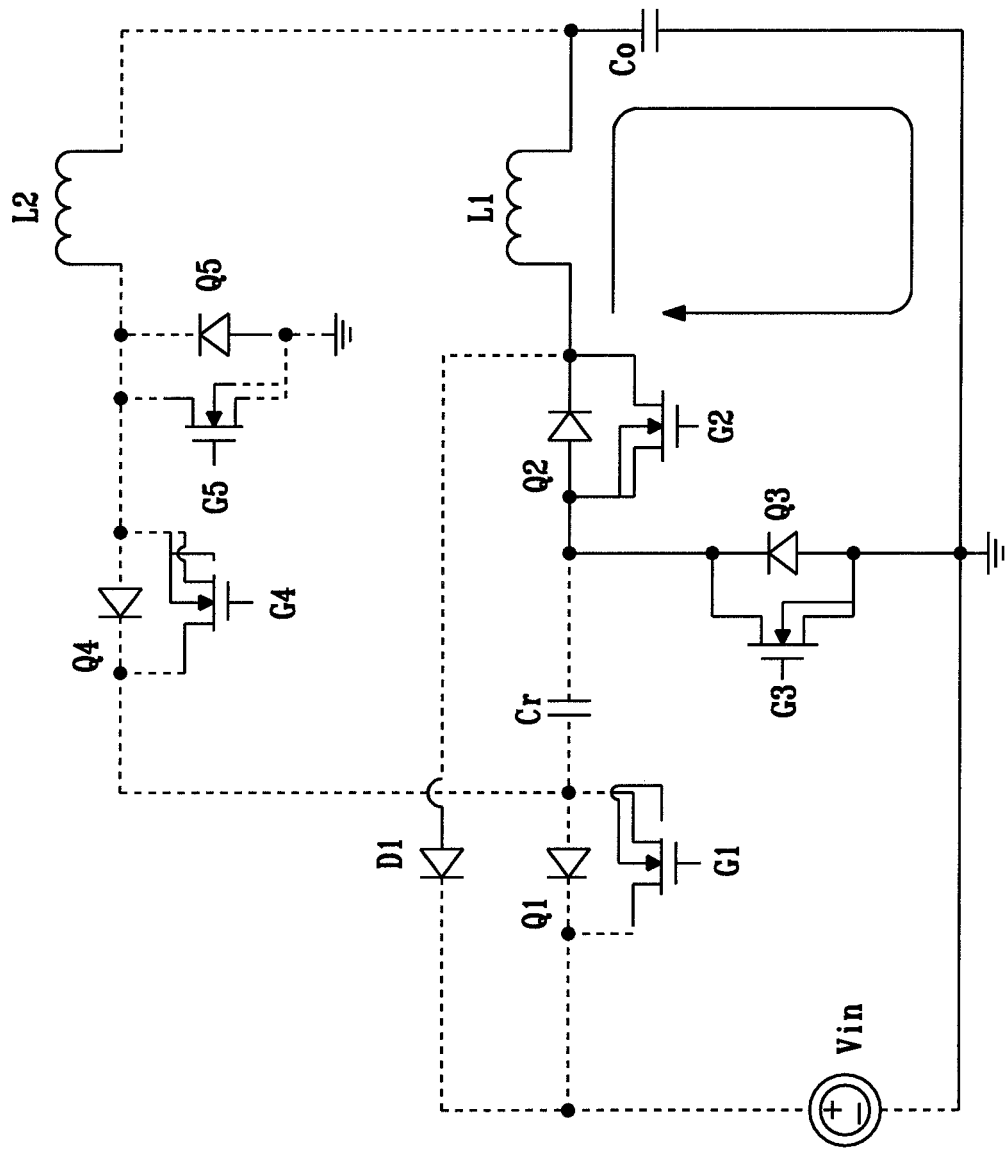
FIG. 7 shows the buck converter of FIG. 1 in a first free-wheel mode of the first phase.

FIG. 7 shows the buck converter of FIG. 1 in a first free-wheel mode of the first phase. In the first free-wheel mode of the first phase, switches Q1, Q4, and Q5 may be turned off. For low power applications, it is preferable to operate the converter in discontinuous mode with synchronized rectifiers Q3 and Q2 operating as ideal diodes (diode emulation mode). The transistor is on during the forward and free-wheel phase. The transistor Q2 may turn off once current reaches zero. The resonant capacitor is chosen in such a way to maintain low voltage ripple (such as e.g. +/−5%). The resonant capacitor Cr will be charged to Vin/2. Diode D1 as mentioned above is for protection and can be omitted if timing of transistor Q2 is not critical.

Figure 8:
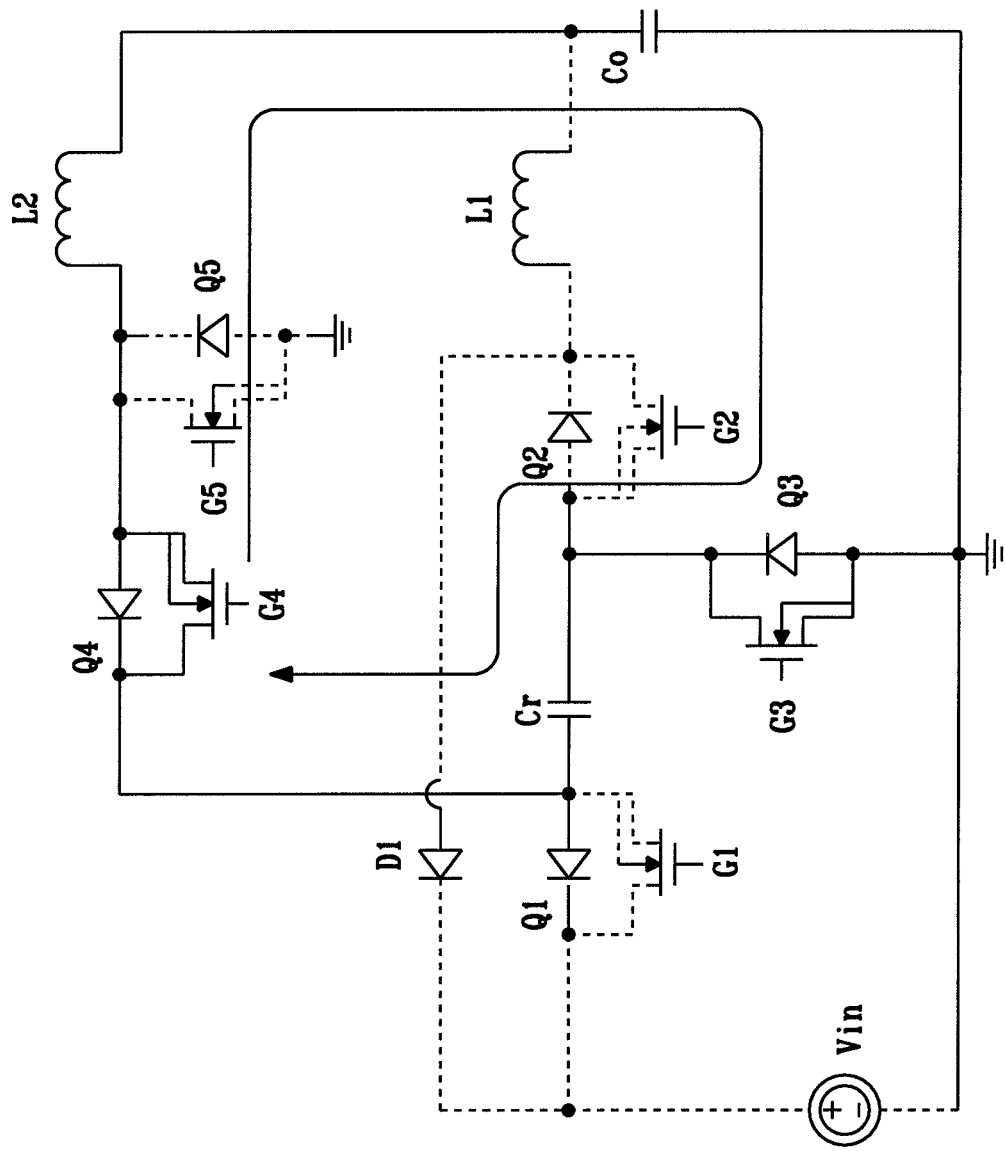
FIG. 8 shows the buck converter of FIG. 1 in a second forward mode of the second phase.
Figure 9:
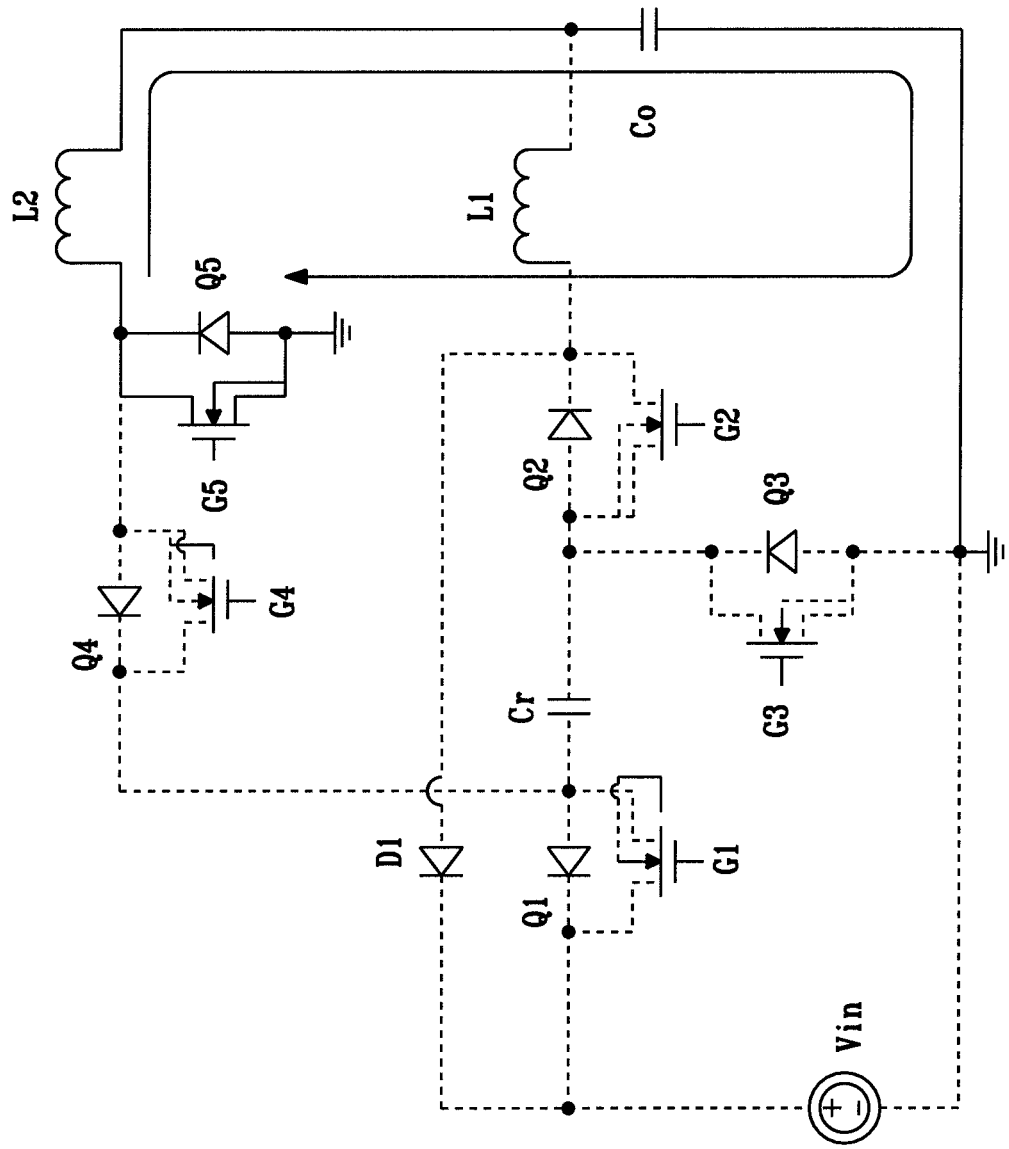
FIG. 9 shows the buck converter of FIG. 1 in a second free-wheel mode of the second phase.

FIG. 8 shows the buck converter of FIG. 1 in a second forward mode of the second phase. In the second forward mode of the second phase, switches Q1, Q2, and Q5 may be turned off. FIG. 9 shows the buck converter of FIG. 1 in a second free-wheel mode of the second phase. In the second free-wheel mode of the second phase, switches Q1, Q2, Q3, and Q4 may be turned off. The resonant capacitor here is acting as voltage source. The capacitor will be discharged during forward time. The forward current path is shown in FIG. 8. During this period, power is delivered to the output, and some energy is stored in inductor L2. The resonant capacitor is discharging during this forward period. For low power applications, it is preferable to operate this stage also in discontinuous mode with synchronized rectifier Q5 operating in diode emulation mode. Transistor Q3 is on during the forward period. Transistor Q5 is synchronized FET operating in diode emulation mode. The resonant capacitor is discharged when the second phase buck stage is active. In order to maintain charge balance on the resonant capacitor, both phases may be enabled.

On the one hand, the power converter may be operated in PWM mode. For instance, the power converter may be operated in PWM mode if circuit parameters are chosen as follows: input voltage Vin=5V, switching frequency Fs=10 MHz, resonant inductors L1=20 nH, L2=20n, resonant capacitor Cr=5 nF Ton=7 nsec, output capacitor Co=2.2 uF, output voltage Vo=1.1V, load current Io=100 mA.

On the other hand, the power converter may be operated in resonant mode. For instance, the power converter may be operated in PWM mode if circuit parameters are chosen as follows: input voltage Vin=5V, switching frequency Fs=10 MHz, resonant inductors L1=20 nH, L2=20n, resonant capacitor Cr=500 pF Ton=7 nsec, output capacitor Co=2.2 uF, output voltage Vo=0.83V, load current Io=100 mA.

It is possible to operate the proposed power converter in single phase mode. This can be done by disabling phase 1. In this case, switch Q2 is off while switches Q1 and Q3 are on all the time. In this case, resonant capacitor is connected in parallel with the input. Phase one is off. Switches Q4 and Q5 are active creating switching pulses for inductor L2. The switch Q4 is a forward switch while switch Q5 is a free-wheel switch.

In conclusion, the presented buck converter offers the following technical advantages: (a) a higher efficiency DCM operation, (b) avoiding excess build-up of voltages due to the reversing of the inductor current in some operating conditions, and (c) flexibility of using coupled inductors. In addition, there are additional advantages associated with the presented topology. The buck topology achieves very large conversion ratio without requiring a very tight control on timing of the high-side switch. The maximum input current may be limited by the values of the capacitor and the inductors. When the low side switch turns on, it is not required to immediately turn on the high side switch.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter configured to convert an input voltage at an input of the power converter into an output voltage at an output of the power converter, the power converter comprising:
   a first switching circuit with a first inductor, a first high-side switching element, and a first low-side switching element,
   a second switching circuit with a second inductor, a second high-side switching element, and a second low-side switching element,
   a capacitive element having a first terminal coupled to the first high-side switching element and to the second high-side switching element, and having a second terminal coupled to the first low-side switching element at a first node, and
   a third switching element coupled between the first node and the output of the power converter.

2. The power converter according to claim 1, wherein the third switching element and the first inductor are coupled in series between the first node and the output of the power converter.

3. The power converter according to claim 1, wherein a first terminal of the third switching element is coupled to the first node and a second terminal of the third switching element is coupled to the first inductor at a second node.

4. The power converter according to claim 3, further comprising
   a directional conducting element coupled between the second node and the input of the power converter.

5. The power converter according to claim 1, wherein the first inductor and the second inductor are positively coupled or negatively coupled.

6. The power converter according to claim 1, further comprising
   a zero crossing detector configured to detect a time when a current through the first inductor reaches zero,
   wherein the power converter is configured to turn off the third switching element when said current through the first inductor reaches zero.

7. The power converter according to claim 1, wherein the power converter is configured to establish, in a first forward mode,
   a first forward current path from the input of the power converter via the first high-side switching element, via the capacitive element, via the third switching element, and via the first inductor to the output of the power converter.

8. The power converter according to claim 7, wherein the power converter is configured to establish, in a first free-wheel mode,
a first free-wheel current path from the first low-side switching element, via the third switching element, and via the first inductor to the output of the power converter.

9. The power converter according to claim 8, wherein the power converter is configured to establish, in a second forward mode,
a second forward current path from the first low-side switching element, via the capacitive element, via the second high-side switching element, and via the second inductor to the output of the power converter.

10. The power converter according to claim 9, wherein the power converter is configured to establish, in a second free-wheel mode,
a second free-wheel current path from the second low-side switching element, and via the second inductor to the output of the power converter.

11. The power converter according to claim 10, wherein the power converter is configured to switch between the first forward mode, the first free-wheel mode, the second forward mode, and the second free-wheel mode.

12. The power converter according to claim 1, wherein
the first high-side switching element is coupled between the input of the power converter and the first terminal of the capacitive element,
the first low-side switching element is coupled between the first node and a reference potential,
the second high-side switching element is coupled between the first terminal of the capacitive element and a first terminal of the second inductor, and
the second low-side switching element is coupled between the first terminal of the second inductor and the reference potential.

13. A method of operating a power converter, wherein the power converter converts an input voltage at an input of the power converter into an output voltage at an output of the power converter, wherein the power converter comprises a first switching circuit with a first inductor, a first high-side switching element, and a first low-side switching element, and wherein the power converter comprises a second switching circuit with a second inductor, a second high-side switching element, and a second low-side switching element, the method comprising:
coupling a first terminal of a capacitive element to the first high-side switching element and to the second high-side switching element,
coupling a second terminal of the capacitive element to the first low-side switching element at a first node, and
coupling a third switching element between the first node and the output of the power converter.

14. The method according to claim 13, comprising
coupling the third switching element and the first inductor in series between the first node and the output of the power converter.

15. The method according to claim 13, comprising
coupling a first terminal of the third switching element to the first node, and
coupling a second terminal of the third switching element to the first inductor at a second node.

16. The method according to claim 15, comprising
coupling a directional conducting element between the second node and the input of the power converter.

17. The method according to claim 13, wherein the first inductor and the second inductor are positively coupled or negatively coupled.

18. The method according to claim 13, wherein the power converter comprises a zero crossing detector for detecting a time when a current through the first inductor reaches zero, and wherein the method comprises
turning off the third switching element when said current through the first inductor reaches zero.

19. The method according to claim 13, comprising
establishing, in a first forward mode, a first forward current path from the input of the power converter via the first high-side switching element, via the capacitive element, via the third switching element, and via the first inductor to the output of the power converter.

20. The method according to claim 19, comprising
establishing, in a first free-wheel mode, a first free-wheel current path from the first low-side switching element, via the third switching element, and via the first inductor to the output of the power converter.

21. The method according to claim 20, comprising
establishing, in a second forward mode, a second forward current path from the first low-side switching element, via the capacitive element, via the second high-side switching element, and via the second inductor to the output of the power converter.

22. The method according to claim 21, comprising
establishing, in a second free-wheel mode, a second free-wheel current path from the second low-side switching element, and via the second inductor to the output of the power converter.

23. The method according to claim 22, comprising
switching between the first forward mode, the first free-wheel mode, the second forward mode, and the second free-wheel mode based on a feedback signal indicative of the voltage or a current at the output of the power converter.

24. The method according to claim 13, comprising
coupling the first high-side switching element between the input of the power converter and the first terminal of the capacitive element,
coupling the first low-side switching element between the first node and a reference potential,
coupling the second high-side switching element between the first terminal of the capacitive element and a first terminal of the second inductor, and
coupling the second low-side switching element between the first terminal of the second inductor and the reference potential.

* * * * *